(12) United States Patent
Jaiswal et al.

(10) Patent No.: US 9,246,948 B2
(45) Date of Patent: Jan. 26, 2016

(54) SYSTEMS AND METHODS FOR PROVIDING TARGETED DATA LOSS PREVENTION ON UNMANAGED COMPUTING DEVICES

(71) Applicant: Symantec Corporation, Mountain View, CA (US)

(72) Inventors: Sumesh Jaiswal, Pune (IN); Prahalad Deshpande, Pune (IN)

(73) Assignee: Symantec Corporation, Mountain View, CA (US)

( * ) Notice: Subject to any disclaimer, the term of this patent is extended or adjusted under 35 U.S.C. 154(b) by 89 days.

(21) Appl. No.: 14/268,186

(22) Filed: May 2, 2014

(65) Prior Publication Data

US 2015/0271207 A1    Sep. 24, 2015

(30) Foreign Application Priority Data

Mar. 19, 2014    (IN) .............................. 346/KOL/2014

(51) Int. Cl.
*H04L 29/06*    (2006.01)
(52) U.S. Cl.
CPC ...................................... *H04L 63/20* (2013.01)
(58) Field of Classification Search
CPC ...................................................... H04L 63/20
USPC ............................................................. 726/1
See application file for complete search history.

(56) References Cited

U.S. PATENT DOCUMENTS

| | | | | |
|---|---|---|---|---|
| 2006/0059561 A1* | 3/2006 | Ronning | .................. | G06F 21/10 726/26 |
| 2012/0210443 A1* | 8/2012 | Blaisdell | .................. | G06F 21/12 726/27 |
| 2012/0246484 A1* | 9/2012 | Blaisdell | .................. | G06F 21/52 713/189 |
| 2012/0246731 A1* | 9/2012 | Blaisdell | .................. | G06F 21/54 726/26 |
| 2012/0304310 A1* | 11/2012 | Blaisdell | .................. | G06F 21/52 726/28 |
| 2013/0247147 A1* | 9/2013 | Pontillo | ................ | H04W 12/02 726/3 |
| 2013/0291086 A1* | 10/2013 | Pontillo | .............. | H04L 63/0823 726/10 |
| 2014/0007184 A1* | 1/2014 | Porras | ..................... | G06F 21/53 726/1 |
| 2014/0108793 A1* | 4/2014 | Barton | ................ | G06F 21/6218 713/165 |
| 2014/0173700 A1* | 6/2014 | Awan | .................... | H04L 63/107 726/4 |

OTHER PUBLICATIONS

"Microsoft Word", http://office.microsoft.com/en-us/word/, as accessed Feb. 12, 2014, Microsoft Corporation, (May 4, 2006).

(Continued)

*Primary Examiner* — Michael S McNally
(74) *Attorney, Agent, or Firm* — ALG Intellectual Property, LLC

(57) ABSTRACT

A computer-implemented method for providing targeted data loss prevention on unmanaged computing devices may include (1) identifying a data loss prevention policy that defines permissible data handling within set bounds to prevent unauthorized data exfiltration from the set bounds, (2) identifying an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds, and (3) wrapping the application in an application wrapper that intercepts system calls from the application and applies the data loss prevention policy to sensitive data implicated in the system calls. Various other methods, systems, and computer-readable media are also disclosed.

20 Claims, 9 Drawing Sheets

(56) References Cited

OTHER PUBLICATIONS

"Architecture of Windows NT", http://en.wikipedia.org/wiki/Architecture_of_Windows_NT, as accessed Feb. 12, 2014, Wikipedia, (Sep. 13, 2006).

"Windows API", http://en.wikipedia.org/wiki/Windows_API, as accessed Feb. 12, 2014, Wikipedia, (Nov. 28, 2003).

Skonnard, Aaron, "Essential WinInet: Developing Applications Using the Windows Internet API with RAS, ISAPI, ASP, and COM", http://www.amazon.com/Essential-WinInet-Developing-Applications-Internet/dp/0201379368, as accessed Feb. 12, 2014, Addison-Wesley Professional, 1st Edition, (Jan. 1, 1999).

"McAfee, Inc.", http://www.mcafee.com/us/, as accessed Feb. 12, 2014, (Feb. 29, 2000).

"Websense, Inc.", http://www.websense.com/content/home.aspx, as accessed Feb. 12, 2014, (Oct. 24, 2008).

Keith Newstadt, et al; Systems and Methods for Data Loss Prevention; U.S. Appl. No. 13/229,984, filed Sep. 12, 2011.

Yin Liu; Systems and Methods for Analyzing Client-Side Storage Security for Internet Applications; U.S. Appl. No. 13/477,415, filed May 22, 2012.

\* cited by examiner

US 9,246,948 B2

SYSTEMS AND METHODS FOR PROVIDING TARGETED DATA LOSS PREVENTION ON UNMANAGED COMPUTING DEVICES

BACKGROUND

In the digital age, individuals and organizations may quickly and easily share, access, and disseminate large volumes of digital information. For many individuals and organizations, the ease with which information may be electronically disseminated is empowering. However, the ease of disseminating digital information may pose unique challenges for organizations concerned with preventing the exposure of sensitive data. Organizations are therefore increasingly looking to data loss prevention (DLP) solutions to protect their sensitive data.

Traditional DLP systems may monitor activity and intercept data at a variety of points in a network and/or computing system in efforts to detect and regulate the flow and access of sensitive data. However, these traditional DLP systems may assume a high level of organizational control over all devices with authorized access to sensitive data—a level of control that may no longer exist for many organizations. For example, many organizations currently allow (or may wish to allow) employees to use personal devices to access, manipulate, and even store the organizations' sensitive data. However, these employees may not wish to subject their personal devices to invasive DLP systems that may scan personal data and even issue reports to the organizations' administrators.

Accordingly, the instant disclosure identifies and addresses a need for additional and improved systems and methods for providing targeted data loss prevention on unmanaged computing devices.

SUMMARY

As will be described in greater detail below, the instant disclosure generally relates to systems and methods for providing targeted data loss prevention on unmanaged computing devices by provisioning unmanaged computing devices with wrapped applications that apply data loss prevention policies to data handled by the wrapped applications (e.g., instead of provisioning the unmanaged computing devices with DLP endpoint agents that apply data loss prevention policies to data on the unmanaged computing devices generally). In some examples, the application wrappers of these wrapped applications may include alternate dynamic linked libraries (DLLs) for use by the wrapped applications and may redirect the applications to use the alternate DLLs.

In one example, a computer-implemented method for providing targeted data loss prevention on unmanaged computing devices may include (1) identifying a data loss prevention policy that defines permissible data handling within set bounds to prevent unauthorized data exfiltration from the set bounds, (2) identifying an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds, and (3) wrapping the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device.

In one embodiment, the application wrapper may intercept system calls from the application by redirecting the application from at least one default dynamic linked library that implements the system calls with at least one alternative dynamic linked library that applies the data loss prevention policy to the system calls. Additionally or alternatively, the application wrapper may intercept system calls from the application by injecting a dynamic linked library into a process of the application that hooks at least one application programming interface function within the process. In one embodiment, the data loss prevention policy may protect data that is owned by a first entity and the unmanaged endpoint device may be owned by a separate entity.

In some examples, the computer-implemented method may further include installing the wrapped application on the unmanaged endpoint device. In some examples, installing the wrapped application on the unmanaged endpoint device may include installing the wrapped application on the unmanaged endpoint device in response to detecting that the unmanaged endpoint device has connected to a network that falls within the set bounds. In one embodiment, (1) the unmanaged endpoint device may include an unwrapped instance of the application, (2) the unwrapped instance of the application is for personal use by an owner of the unmanaged endpoint device and is not subject to the data loss prevention policy, and (3) an organization designates the wrapped instance of the application as for use by the owner of the unmanaged endpoint device to handle data that is owned by the organization and that is subject to the data loss prevention policy.

In one embodiment, the set bounds may include data handled by the wrapped application on the unmanaged endpoint device and may exclude data handled by at least one unwrapped application on the unmanaged endpoint device. In some examples, the computer-implemented method may further include streaming the wrapped application to the unmanaged endpoint device.

In some examples, applying the data loss prevention policy to the sensitive data implicated in the system calls may include (1) encrypting the sensitive data before writing the sensitive data to a storage device accessible by the unmanaged endpoint device to prevent access to the sensitive data outside the unwrapped application, and (2) decrypting the sensitive data before reading the sensitive data from the storage device. Additionally or alternatively, applying the data loss prevention policy to the sensitive data implicated in the system calls may include (1) applying the data loss prevention policy to determine whether to transmit the sensitive data from the unmanaged computing device across a network, (2) applying the data loss prevention policy to determine whether to copy the sensitive data to a clipboard service on the unmanaged computing device, and/or (3) applying the data loss prevention policy to determine whether to print the sensitive data via a printer accessible to the unmanaged computing device.

In one embodiment, (1) the data loss prevention policy may allow a mode of handling the sensitive data when the unmanaged computing device is connected to a network that is controlled by an entity that controls the data loss prevention policy and (2) the data loss prevention policy may not allow the mode of handling the sensitive data when the unmanaged computing device is not connected to the network.

In one embodiment, a system for implementing the above-described method may include (1) a policy identification module, stored in memory, that identifies a data loss prevention policy that defines permissible data handling within set bounds to prevent unauthorized data exfiltration from the set bounds, (2) an application identification module, stored in memory, that identifies an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds, (3) a wrapping module, stored in memory, that wraps the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device, and (4) at least one physical processor configured to execute the policy identification module, the application identification module, and the wrapping module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data loss prevention policy that defines permissible data handling within set bounds to prevent unauthorized data exfiltration from the set bounds, (2) identify an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds, and (3) wrap the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
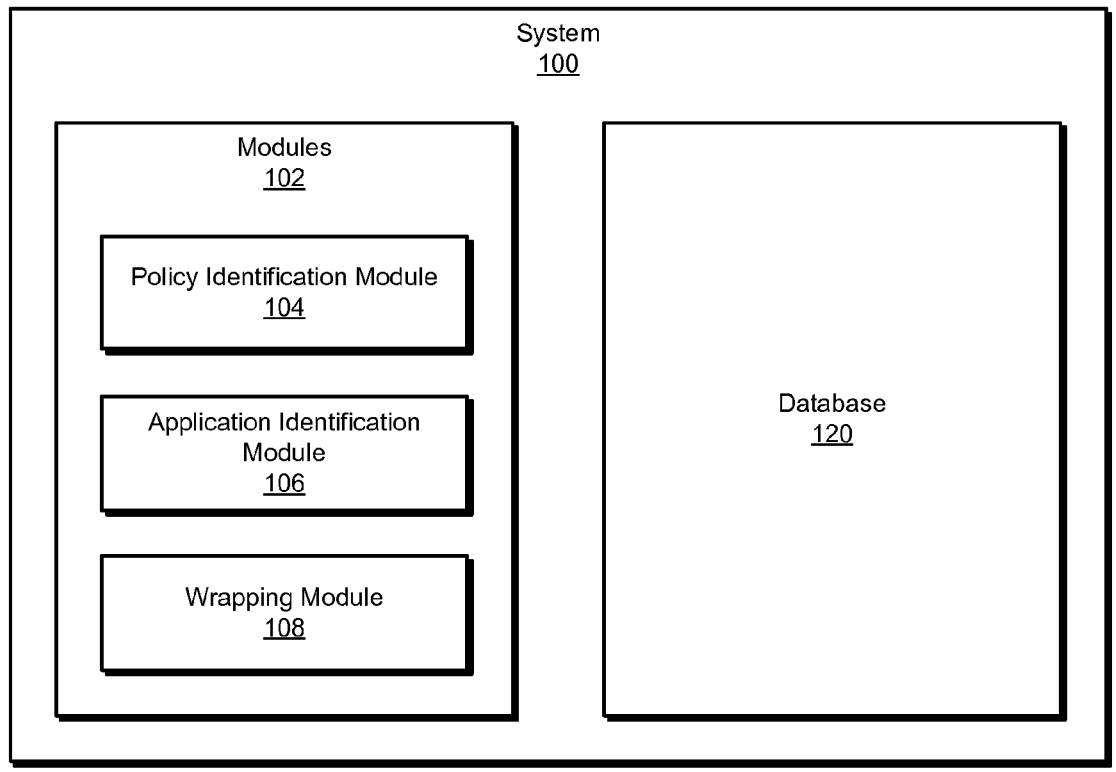
FIG. 1 is a block diagram of an exemplary system for providing targeted data loss prevention on unmanaged computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing targeted data loss prevention on unmanaged computing devices. As will be explained in greater detail below, by provisioning unmanaged computing devices with wrapped applications that apply data loss prevention policies to data handled by the wrapped applications (e.g., instead of provisioning the unmanaged computing devices with DLP endpoint agents that apply data loss prevention policies to data on the unmanaged computing devices generally), the systems and methods described herein may provide DLP protection to unmanaged endpoint devices with minimal intrusion (e.g., to personal data) while still providing full protection for sensitive organizational data. In some examples, the application wrappers of these wrapped applications may include alternate dynamic linked libraries (DLLs) for use by the wrapped applications and may redirect the applications to use the alternate DLLs. In this manner, the systems and methods described herein may facilitate the application of DLP policies to specific applications on endpoint devices without requiring potentially intrusive standalone DLP agents executing on the endpoint devices.

The following will provide, with reference to FIGS. 1, 2, and 4-5, detailed descriptions of exemplary systems for providing targeted data loss prevention on unmanaged computing devices. Detailed descriptions of corresponding computer-implemented methods will also be provided in connection with FIG. 3. Detailed descriptions of applications prepared for targeted data loss prevention will be provided in connection with FIGS. 6-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for providing targeted data loss prevention on unmanaged computing devices. As illustrated in this figure, exemplary system 100 may include one or more modules 102 for performing one or more tasks. For example, and as will be explained in greater detail below, exemplary system 100 may also include a policy identification module 104 that may identify a data loss prevention policy that defines permissible data handling within set bounds to prevent unauthorized data exfiltration from the set bounds. Exemplary system 100 may additionally include an application identification module 106 that may identify an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds. Exemplary system 100 may also include a wrapping module 108 that may wrap the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or unmanaged endpoint device 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more data loss prevention policies, one or more applications, one or more application wrappers, and/or one or more wrapped applications.

Database 120 may represent portions of a single database or computing device or a plurality of databases or computing devices. For example, database 120 may represent a portion of computing device 202 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as computing device 202 in FIG. 2, computing system 810 in FIG. 8, and/or portions of exemplary network architecture 900 in FIG. 9.

Figure 2:
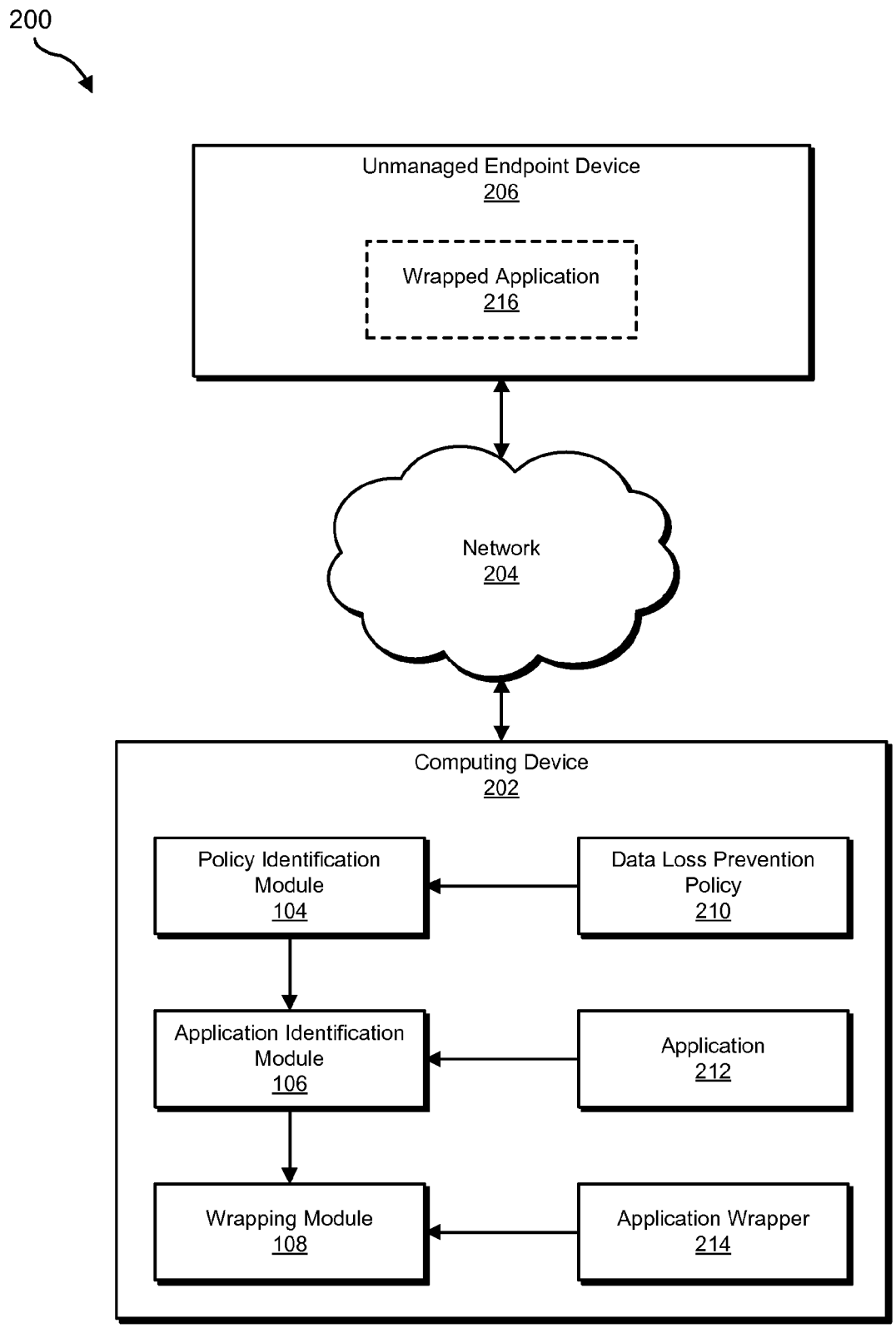
FIG. 2 is a block diagram of an additional exemplary system for providing targeted data loss prevention on unmanaged computing devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an unmanaged endpoint device 206 via a network 204. In one example, computing device 202 may be programmed with one or more of modules 102 and/or may store all or a portion of the data in database 120. Additionally or alternatively, unmanaged endpoint device 206 may be programmed with one or more of modules 102 and/or may store all or a portion of the data in database 120.

In one embodiment, one or more of modules 102 from FIG. 1 may, when executed by at least one processor of computing device 202 and/or unmanaged endpoint device 206, enable computing device 202 and/or unmanaged endpoint device 206 to provide targeted data loss prevention on unmanaged computing devices. For example, and as will be described in greater detail below, policy identification module 104 may identify a data loss prevention policy 210 that defines permissible data handling within set bounds to prevent unauthorized data exfiltration from the set bounds (e.g., from network 204 and/or unmanaged endpoint device 206). Application identification module 106 may identify an application 212 to install on unmanaged endpoint device 206, where (i) unmanaged endpoint device 206 lacks a data loss prevention agent configured to apply data loss prevention policy 210 to unmanaged endpoint device 206 in entirety and (ii) application 212 is to be provided to unmanaged endpoint device 206 to operate on sensitive data from within the set bounds. Wrapping module 108 may wrap application 212 in an application wrapper 214 that intercepts system calls from application 212 and applies data loss prevention policy 210 to sensitive data implicated in the system calls, where application wrapper 214 thereby applies data loss prevention policy 210 to data handled by application 212 instead of applying data loss prevention policy 210 to unmanaged endpoint device 206 in entirety.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Unmanaged endpoint device 206 generally represents any type or form of computing device that is capable of handling, storing, and/or accessing sensitive data. Examples of unmanaged endpoint device 206 include, without limitation, laptops, tablets, cellular phones, Personal Digital Assistants (PDAs), multimedia players, embedded systems, wearable devices (e.g., smart watches, smart glasses, etc.), desktops, servers, gaming consoles, combinations of one or more of the same, exemplary computing system 810 in FIG. 8, or any other suitable computing device.

Network 204 generally represents any medium or architecture capable of facilitating communication or data transfer. Examples of network 204 include, without limitation, an intranet, a Local Area Network (LAN), a Personal Area Network (PAN), a Wide Area Network (WAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and unmanaged endpoint device 206.

Figure 3:
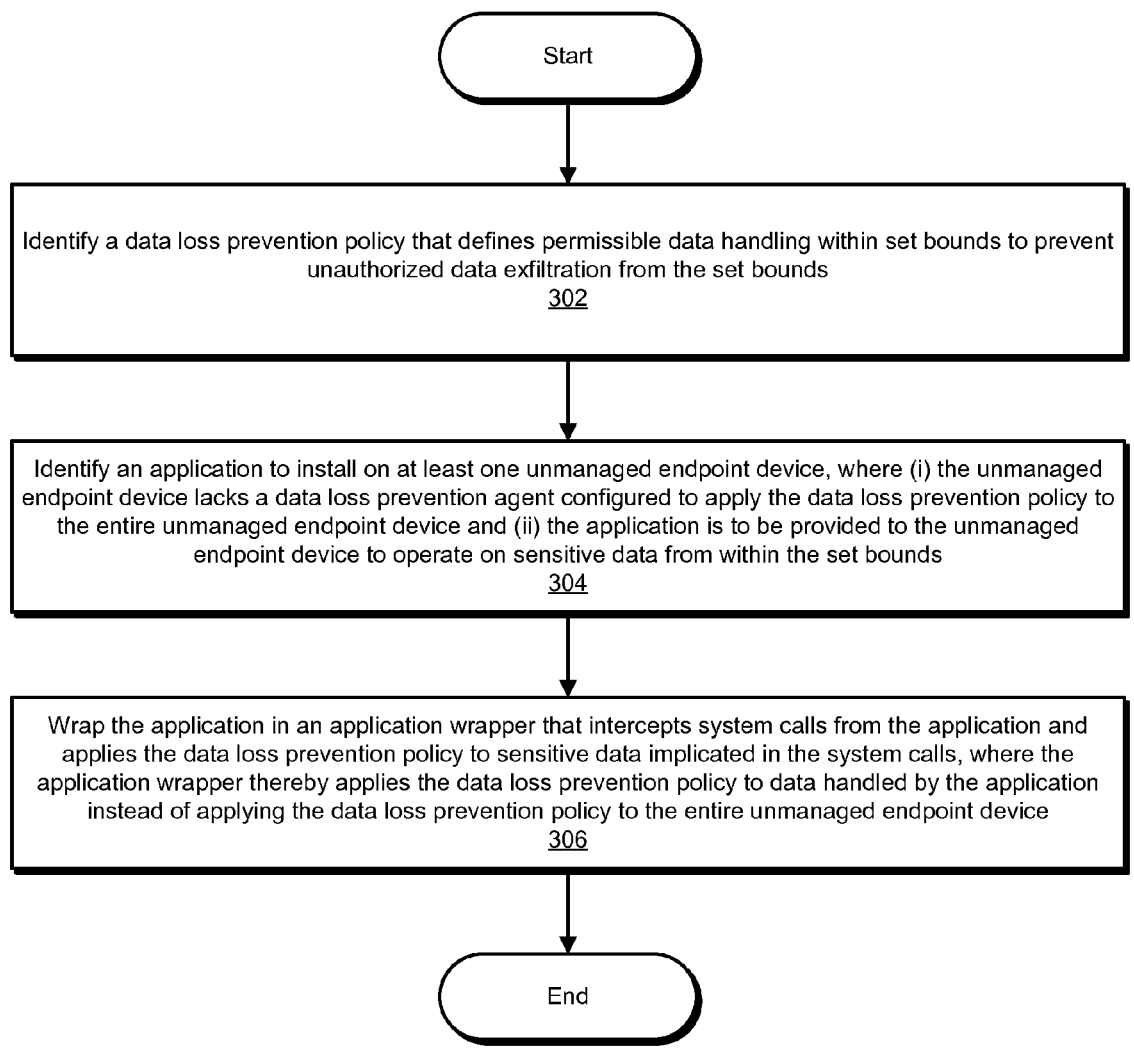
FIG. 3 is a flow diagram of an exemplary method for providing targeted data loss prevention on unmanaged computing devices.

FIG. 3 is a flow diagram of an exemplary computer-implemented method 300 for providing targeted data loss prevention on unmanaged computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may identify a data loss prevention policy that defines permissible data handling within set bounds to prevent unauthorized data exfiltration from the set bounds. For example, at step 302 policy identification module 104 may, as part of computing device 202 in FIG. 2, identify a data loss prevention policy 210 that defines permissible data handling within set bounds to prevent unauthorized data exfiltration from the set bounds.

As used herein, the phrase "data loss prevention policy" may refer to any policy that defines permissible data handling within set bounds to prevent unauthorized data exfiltration from the set bounds. For example, a data loss prevention policy may include one or more rules and/or heuristics that determines the disposition of data in various scenarios in order to prevent sensitive data from leaking (e.g., being transmitted outside the set bounds under uncontrolled circumstances), being accessed by unauthorized parities, and/or being used and/or stored in unsecure contexts. Accordingly, as used herein, the phrase "set bounds" may refer to any bounds within which a data loss prevention policy may apply. In some examples, the phrase "set bounds" may refer to the scope of a data loss prevention policy. For example, the set bounds may refer to one or more networks, devices, and/or applications to which the data loss prevention policy applies. Additionally or alternatively, the phrase "set bounds" may refer to users and/or circumstances to which the data loss prevention policy applies. In some examples, the set bounds may include data handled by a wrapped application on an unmanaged endpoint device and exclude data handled by at least one unwrapped application on the unmanaged endpoint device. For example, a data loss prevention policy may only be implemented with respect to the wrapped application and may prevent data passing from the wrapped application to a location outside the set bounds (e.g., the unwrapped application and/or another portion of the unmanaged endpoint device).

Figure 4:
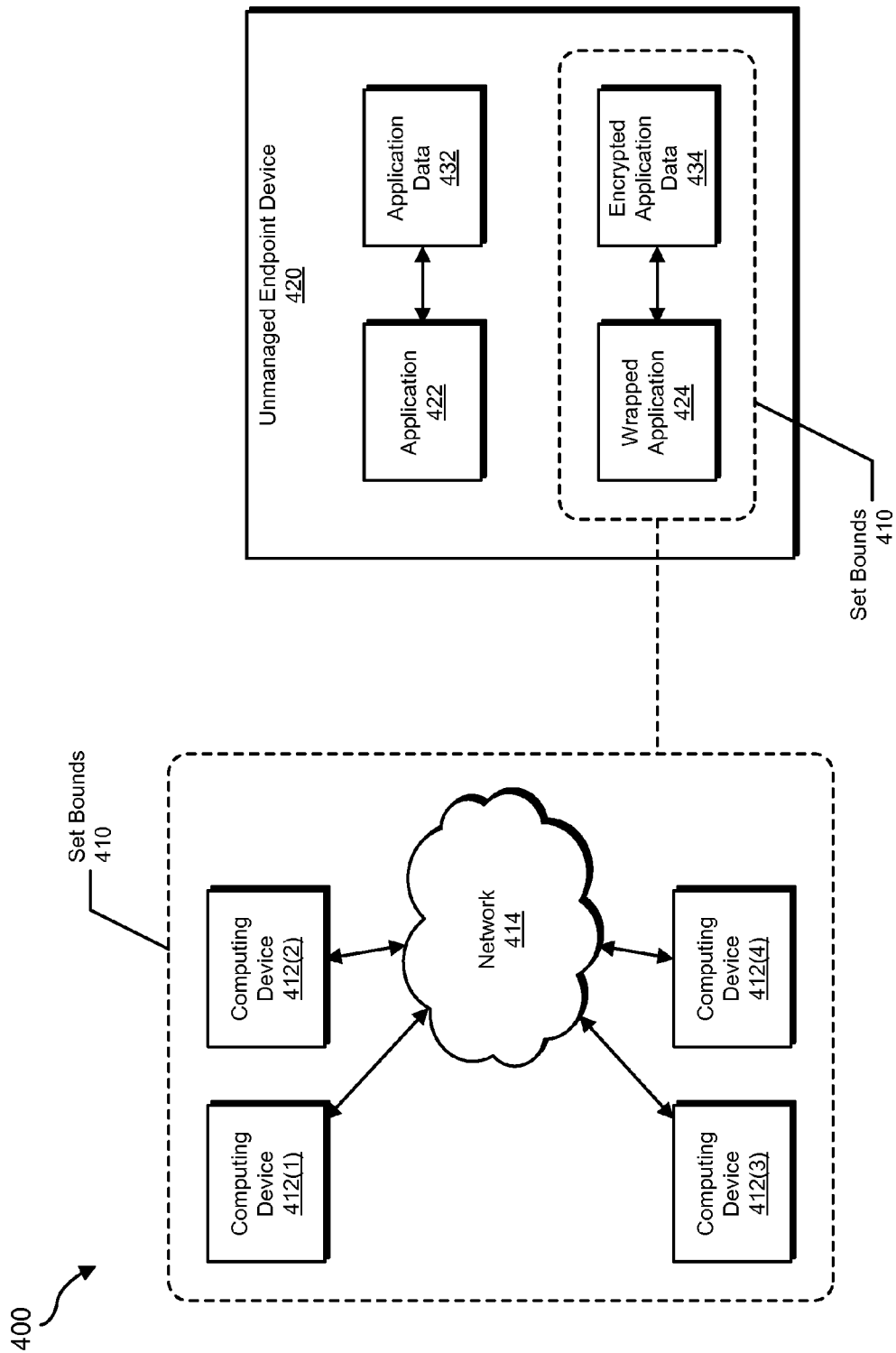
FIG. 4 is a block diagram of an exemplary system for providing targeted data loss prevention on unmanaged computing devices.

To provide an example of the set bounds of a data loss prevention policy, FIG. 4 illustrates an exemplary system 400. As shown in FIG. 4, system 400 may include a network 414 connecting computing devices 412(1)-(4). System 400 may also include an endpoint device 420. In one example, an organization may control network 414 and connected computing devices 412(1)-(4) and may wish to prevent sensitive data from leaking from network 414. Accordingly, a data loss prevention policy for network 414 may define and/or implement set bounds 410 to prevent sensitive data from leaving set bounds 410 (e.g., from leaving network 414). However, the organization may also wish to allow a user within the organization to handle sensitive data from network 414 with an unmanaged endpoint device 420 that may not be under the control of the organization and/or may not always be attached to network 414. Accordingly, as will be described in greater detail below, one or more of the systems described herein may implement set bounds 410 on and/or extend set bounds 410 to a wrapped application 424 and corresponding encrypted application data 434 on unmanaged endpoint device 420 (without, e.g., extending the reach of the data loss prevention policy to an application 422 or application data 432 on unmanaged endpoint device 420).

As used herein, the phrase "data handling" may refer to any operation on data. For example, data handling may include reading data, writing data, copying data, transmitting data, creating data, modifying data, and/or storing data. As used herein, the phrase "data exfiltration" may refer to any data extrusion and/or data leakage and/or exposure of data. For example, the phrase "data exfiltration" may refer to any movement and/or risk of movement by data (e.g., sensitive data) outside the set bounds of a data loss prevention policy.

Policy identification module 104 may identify the data loss prevention policy in any of a variety of ways. For example, policy identification module 104 may identify the data loss prevention policy by communicating with a data loss prevention system and/or querying a data store of a data loss prevention system. Additionally or alternatively, policy identification module 104 may identify the data loss prevention policy by identifying an application wrapper that includes the data loss prevention policy. In some examples, policy identification module 104 may identify the data loss prevention policy by reading a configuration setting.

Returning to FIG. 3, at step 304 one or more of the systems described herein may identify an application to install on at least one unmanaged endpoint device, where (i) the unmanaged endpoint device lacks a data loss prevention agent configured to apply the data loss prevention policy to the entire unmanaged endpoint device and (ii) the application is to be provided to the unmanaged endpoint device to operate on sensitive data from within the set bounds. For example, at step 304 application identification module 106 may, as part of computing device 202 in FIG. 2, identify application 212 to install on unmanaged endpoint device 206, where (i) unmanaged endpoint device 206 lacks a data loss prevention agent configured to apply data loss prevention policy 210 to the entirety of unmanaged endpoint device 206 and (ii) application 212 is to be provided to unmanaged endpoint device 206 to operate on sensitive data from within the set bounds (e.g., from network 204 and/or unmanaged endpoint device 206).

As used herein, the term "application" may refer to any application, program, software, and/or package that may be installed on and/or that may execute on a computing device. In some examples, the term "application" may refer to a program that a user may use to perform one or more tasks that may involve handling sensitive data. Examples of applications may include MICROSOFT WORD and MICROSOFT INTERNET EXPLORER.

As used herein, the phrase "endpoint device" may refer to any computing device onto which an application may be installed. In some examples, the phrase "endpoint device" may refer to a computing device with a human interface. As used herein, the phrase "unmanaged endpoint device" may refer to any endpoint device that does not entirely fall within the scope of a data loss prevention policy. In some examples, an unmanaged endpoint device may lack a data loss prevention agent that manages data loss prevention for the entire unmanaged endpoint device. As used herein, the phrase "data loss prevention agent" may refer to any program, module, daemon, script, and/or process that implements a data loss prevention policy for an endpoint device. In some examples, the phrase "data loss prevention agent" may refer to a stand-alone program that monitors attempts by any process on an endpoint device to access one or more data handling features of the endpoint device. For example, a data loss prevention agent may monitor and/or control data handling behaviors of applications on an endpoint device by intercepting predefined system calls from all applications on the endpoint device.

In some examples, the data loss prevention policy may protect data that is owned by a first entity and the unmanaged endpoint device may be owned by a separate entity. In these examples, the data loss prevention policy may not be applicable to data owned by the separate entity, and an application of the data loss prevention policy to the data owned by the separate entity may be considered intrusive by the second entity. For example, the data loss prevention policy may protect data that is owned by an organization (e.g., and that generally resides on a network controlled by the first entity) and the unmanaged endpoint device may be owned by an employee of the organization who uses the unmanaged endpoint device for work within the organization (e.g., and, thus, may handle data owned by the organization and subject to the data loss prevention policy on the unmanaged endpoint device). Additionally or alternatively, the data subject to the data loss prevention policy and the unmanaged endpoint device may be owned and/or controlled by the same entity. For example, an organization may own one or more endpoint devices that are within the set bounds of a data loss prevention policy but which are not protected with a data loss prevention agent. For example, the unmanaged endpoint devices owned by the organization may be primarily used for application streaming (e.g., via an application virtualization framework that enables an organization to provision devices with applications on an as-needed basis). In this example, repeatedly re-installing and/or reconfiguring such unmanaged endpoint devices with data loss prevention agents may be inefficient and/or cumbersome for the organization. Accordingly, as will be explained in greater detail below, the systems and methods described herein may stream wrapped applications to the unmanaged endpoint devices. Examples of application virtualization frameworks may include MICROSOFT APP-V.

As used herein, the phrase "sensitive data" may refer to any data that may be subject to a data loss prevention policy. For example, the phrase "sensitive data" may refer to data that is confidential, private, personal, and/or designated to not be public and/or indiscriminately shared. Examples of sensitive data may include, without limitation, intellectual property, financial account information (e.g., bank account information, credit card information), medical records, client information, social security numbers, personal and/or private information (e.g., names, telephone numbers, addresses, etc.), and authentication information (e.g., usernames, passwords, etc.).

Application identification module 106 may identify the application in any of a variety of ways and in any of a variety of contexts. For example, application identification module 106 may identify the application by reading a configuration setting set by an administrator that identifies the application as an application to be installed on one or more unmanaged endpoint devices. For example, application identification module 106 may identify a list of applications to be wrapped in an application wrapper to implement a data loss prevention policy with respect to the application on unmanaged endpoint devices. Additionally or alternatively, application identification module 106 may identify the application by detecting that an unmanaged endpoint device has connected to a network (e.g., that is controlled by an organization with a data loss prevention policy). For example, application identification module 106 may scan the unmanaged endpoint device for one or more applications that are installed on the unmanaged endpoint device and that are expected to handle sensitive data (e.g., because they are applications used in the course of business to handle sensitive data protected by the data loss prevention policy). In this example, application identification module 106 may compare a list of applications installed on the unmanaged endpoint device with a predefined list of applications to install on unmanaged endpoint devices. In some examples, application identification module 106 may determine that a wrapped version of the application has not yet be installed on the unmanaged endpoint device.

Returning to FIG. 3, at step 306 one or more of the systems described herein may wrap the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device. For example, at step 306 wrapping module 108 may, as part of computing device 202 in FIG. 2, wrap application 212 in application wrapper 214 that intercepts system calls from application 212 and applies data loss prevention policy 210 to sensitive data implicated in the system calls, where application wrapper 214 thereby applies data loss prevention policy 210 to data handled by application 212 instead of applying data loss prevention policy 210 to the entirety of unmanaged endpoint device 206.

As used herein, the phrase "application wrapper" may refer to any module, library, or program that may alter the behavior of an application when applied to the application. In some examples, an application wrapper may include one or more components for injecting one or more modules into an application and/or for hooking and/or redirecting one or more calls performed by the application. In some examples, the application wrapper may include a data loss prevention policy and/or a decision engine that applies and/or constitutes a data loss prevention policy.

As used herein, the phrase "system call" may refer to any call performed by an application to a procedure, function, and/or service provided by a system in which the application operates. In some examples, the phrase "system call" may refer to an application programming interface (API) call to a function provided in a system DLL upon which the application depends. For example, an operating system may include several DLLs, including "kernel32.dll", "user32.dll", "gdi32.dll", and "ntdll.dll". The application may be configured to depend on "kernel32.dll", "user32.dll", "gdi32.dll", and "ntdll.dll" to perform one or more system calls.

Figure 5:
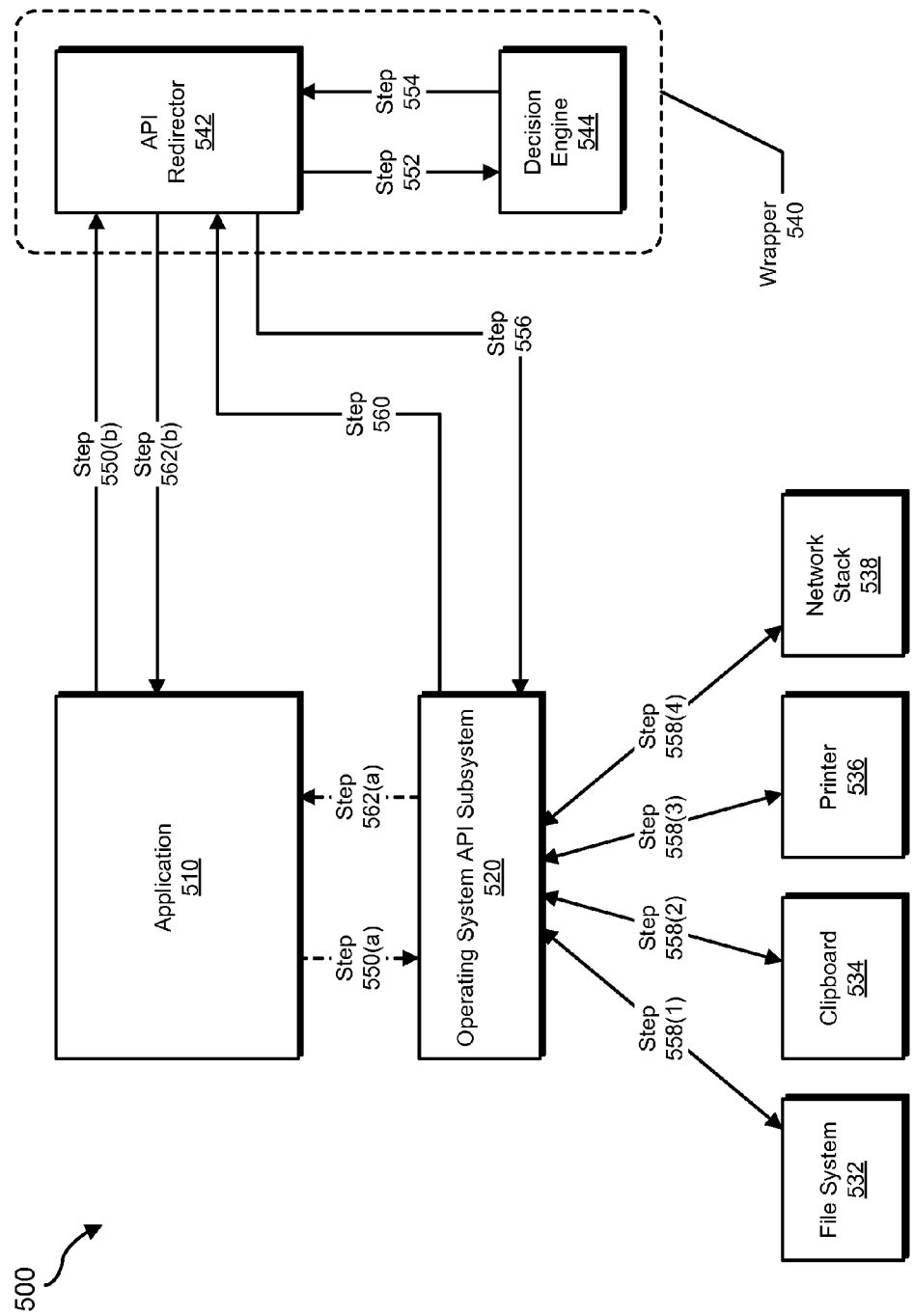
FIG. 5 is a block diagram of an exemplary system for providing targeted data loss prevention on unmanaged computing devices.

To provide an example of a wrapped application, FIG. 5 illustrates an exemplary system 500. As shown in FIG. 5, system 500 may include an application 510 that interacts with an operating system API subsystem 520 to perform predefined data handling operations with various resources, including a file system 532, a clipboard 534, a printer 536, and a network stack 538. Accordingly, when application 510 is unwrapped, at step 550(a) application 510 may perform an API call (e.g., with parameters) to operating system API subsystem 520. At one of steps 558(1)-(4) operating system API subsystem may interface with one of resources 532, 534, 536, and 538. At step 562(a), operating system API subsystem 520 may return a result of the API call to application 510. As shown in FIG. 5, in some examples a wrapper 540 may be applied to application 510. In these examples, wrapper 540 may redirect attempts by application 510 to communicate with operating system API subsystem 520. For example, at step 550(b) application 510 may perform an API call (e.g., with parameters) that is redirected via API redirector 542. At step 552, API redirector 542 may expose the API call to a decision engine 544 (e.g., that applies a data loss prevention policy to the API call). At step 554, decision engine 544 may provide a decision to API redirector 542 (e.g., about whether to allow, block, or modify the API call). At step 556, API redirector 542 may forward the API call (as appropriate) to operating system API subsystem 520. Then, at one of steps 558(1)-(4), operating system API subsystem may interface with one of resources 532, 534, 536, and 538. At step 560, operating system API subsystem 520 may return the result of the call to API redirector 542. API redirector 542 may then, at step 562(*b*), return the result of the call to application 510.

Wrapping module 108 may wrap the application in any of a variety of ways. For example, wrapping module 108 may wrap the application in an application wrapper that intercepts system calls from the application by redirecting the application from at least one default dynamic linked library that implements the system calls with at least one alternative dynamic linked library that applies the data loss prevention policy to the system calls. For example, the application wrapper may include alternate DLLs for the application and may include a manifest that points the application to the alternate DLLs instead of the default system DLLs of the unmanaged endpoint device.

Figure 6:
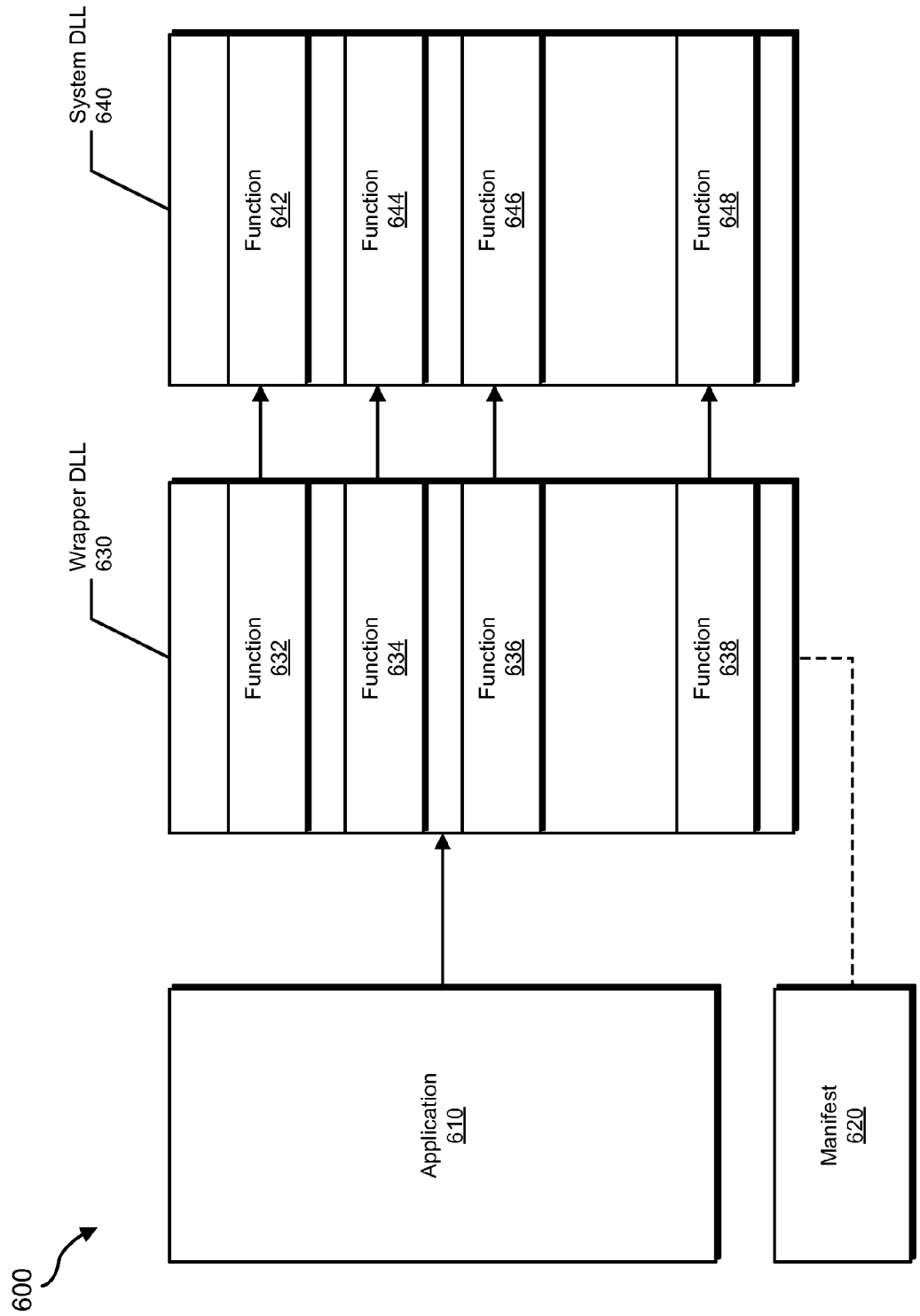
FIG. 6 is a block diagram of an exemplary application prepared for providing targeted data loss prevention on unmanaged computing devices.

To provide an example of wrapping an application, FIG. 6 illustrates an exemplary system 600. As shown in FIG. 6, system 600 may include an application 610. Application 610 may include calls to one or more of functions 642, 644, 646, and 648 defined in a system DLL 640. However, wrapping module 108 may provision application 610 with a manifest 620 that causes application 610 to load a wrapper DLL 630 instead of system DLL 640. Wrapper DLL 630 may include functions 632, 634, 636, and 638 that correspond to functions 642, 644, 646, and 648 respectively. For example, an attempt by application 610 to call function 646 of system DLL 640 may result in a call to function 636 in wrapper DLL 630. Function 636 may apply a DLP policy to the call before forwarding the call to function 646 in system DLL 640. In one example, system DLL 640 may represent "kernel32.dll" and functions 632, 634, 636, and 638 may represent "CreateFile", "ReadFile", "WriteFile", and "OpenFile", respectively.

In some examples, wrapping module 108 may wrap the application in an application wrapper that intercepts system calls from the application by injecting a dynamic linked library into a process of the application that hooks at least one application programming interface function within the process. For example, when the application is executed, a runtime portion of the application wrapper may execute and inject a DLL included within the application wrapper (e.g., with a 'CreateRemoteThread("LoadLibrary")' call). The injected DLL may hook all relevant APIs in the process and redirect the relevant APIs to corresponding functions within the DLL (e.g., that may apply DLP policies to API calls). The DLL may hook the relevant APIs in any suitable manner. For example, the DLL may employ MICROSOFT DETOURS to hook the relevant APIs.

Figure 7:
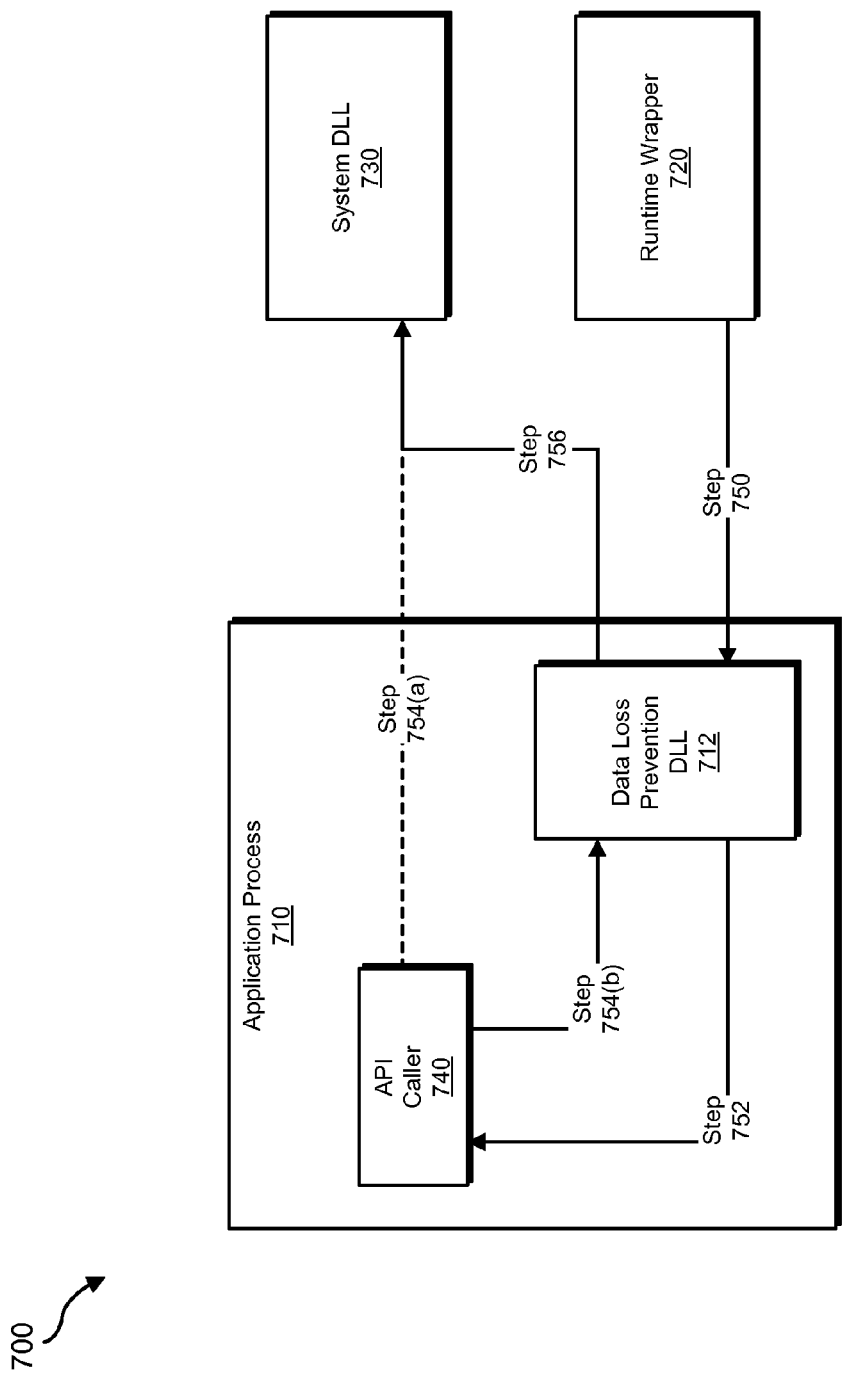
FIG. 7 is a block diagram of an exemplary application prepared for providing targeted data loss prevention on unmanaged computing devices.

To provide another example of wrapping an application, FIG. 7 illustrates an exemplary system 700. As shown in FIG. 7, system 700 may include an application process 710, a runtime wrapper 720, and a system DLL 730. In one example, application process 710 may spawn from an unwrapped application. In this example, an API caller 740 within application process 710 may issue an API call at step 754(*a*) via system DLL 730. In another example, application process 710 may spawn from a wrapped application, causing runtime wrapper 720 to execute. In this example, at step 750, runtime wrapper 720 may inject a data loss prevention DLL 712 into application process 710. At step 752, data loss prevention DLL 712 may hook API caller 740 within application process 710. API caller 740 may, therefore, issue an API call at step 754(*b*) via data loss prevention DLL 712. Data loss prevention DLL 712 may then apply a DLP policy to the API call. At step 756, data loss prevention DLL 712 may forward the API call to system DLL 730.

The application wrapper may apply the data loss prevention policy to the sensitive data implicated in the system calls in any of a variety of ways. For example, the application wrapper may encrypt the sensitive data before writing the sensitive data to a storage device accessible by the unmanaged endpoint device to prevent access to the sensitive data outside the unwrapped application. Similarly, the application wrapper my decrypt the sensitive data before reading the sensitive data (e.g., within the application) from the storage device. Using FIG. 4 as an example, by ensuring that data stored by wrapped application 424 on unmanaged endpoint device 420 is encrypted, the systems and methods described herein may ensure that sensitive data handled by wrapped application 424 is not exposed outside set bounds 410 (e.g., by preventing other applications that operate outside the scope of the data loss prevention policy, such as application 422, from accessing unencrypted data handled by wrapped application 424).

Generally, the application wrapper may apply the data loss prevention policy to the sensitive data implicated in the system calls by applying the data loss prevention policy to any of a variety of attempted operations by the application on the sensitive data. For example, applying the data loss prevention policy may include determining whether to transmit the sensitive data from the unmanaged computing device across a network (e.g., an unmanaged network not owned by an administrator of the data loss prevention policy). Additionally or alternatively, applying the data loss prevention policy may include determining whether to copy the sensitive data to a clipboard service on the unmanaged computing device (e.g., thereby potentially allowing a user to paste the sensitive data into other, unmanaged, applications). As another example, applying the data loss prevention policy may include determining whether to print the sensitive data via a printer accessible to the unmanaged computing device.

In some examples, the application wrapper may include one or more context-sensitive rules for applying the data loss prevention policy. In some examples, these context-sensitive rules may depend on whether or not the unmanaged endpoint device is on a managed site. For example, the data loss prevention policy may allow a mode of handling the sensitive data when the unmanaged computing device is connected to a network that is controlled by an entity that controls the data loss prevention policy and may not allow the mode of handling the sensitive data when the unmanaged computing device is not connected to the network. For example, the application wrapper may prevent any access to the sensitive data when the unmanaged endpoint device is not connected to a specified network (e.g., that falls within the scope of the data loss prevention policy) and may allow access to the sensitive data when the unmanaged endpoint device is connected to the specified network. Thus, an employee may bring a personal laptop to work, but may not access sensitive data from home. In some examples, the application wrapper may provide limited access to the sensitive data when the unmanaged endpoint device is not connected to the specified network (e.g., allowing the application to decrypt and load the sensitive data but not allowing the application to print the sensitive data) and may provide full access to the sensitive data when the unmanaged endpoint device is connected to the specified network.

In some examples, as mentioned earlier, wrapping module 108 may also install the wrapped application on the unmanaged endpoint device. For example, wrapping module 108 may install the wrapped application on the unmanaged endpoint device in response to detecting that the unmanaged endpoint device has connected to a network that falls within the set bounds. In one example, the unmanaged endpoint device may include an unwrapped instance of the application. The unwrapped instance of the application may be for personal use by an owner of the unmanaged endpoint device and, therefore, not subject to the data loss prevention policy. An organization (e.g., that owns the sensitive data and administers the data loss prevention policy) may designate the wrapped instance of the application as for use by the owner of the unmanaged endpoint device to handle data that is owned by the organization and that is subject to the data loss prevention policy. For example, an employee of an organization may own a personal laptop with a personal copy of MICROSOFT WORD. The employee may also require MICROSOFT WORD in the course of the employee's work for the organization. Accordingly, the systems and methods described herein may provision the employee's personal laptop with a wrapped instance of MICROSOFT WORD that is designated for handling sensitive data owned by the organization. Accordingly, the user may have two copies of MICROSOFT WORD installed on the personal laptop. In some examples, an attempt to copy a MICROSOFT WORD document from the organization's network to the personal laptop may be intercepted by a data loss prevention system on the organization's network, which may encrypt the MICROSOFT WORD document such that the designated wrapped instance of MICROSOFT WORD on the personal laptop can read the MICROSOFT WORD document but the personal instance of MICROSOFT WORD cannot.

In some examples, systems and methods described herein may protect the wrapped application against tampering. For example, an organization that administrates the data loss prevention policy may maintain a list of all applications to be wrapped. When a user logs in to a portal provided by the organization, these systems may push a host checker application onto the unmanaged endpoint device to check for the presence of wrapped applications and may re-install any missing application or manifest files for the wrapped applications. When a wrapped application executes, the application wrapper may protect the manifest and other related files and prevent tampering of these files. If a user deletes the manifest file of a wrapped application after application shutdown, the user may be unable to access the data created by the wrapped version of the application, because without the DLLs specified by the manifest, the application may be unable to decrypt the data. In some examples, tampering with the binary files of the application wrapper may result in the application being unable to launch even within a managed network controlled by the organization.

As explained above in connection with method 300 in FIG. 3, the systems and methods described herein may provide targeted data loss prevention for unmanaged endpoint devices. In some contexts, these systems and methods may provide targeted data loss prevention for applications installed on employees' personal devices that may be used to access privileged company information and applications. In some contexts, these systems and methods may be used to provide bundled data loss prevention for virtualized and/or streamed applications (e.g., on virtual desktops). By providing targeted data loss prevention, these systems and methods may prevent personal data from being subject to DLP scans. These systems and methods may enable the segregation of personal data and applications from business data and applications, thereby preventing data loss in a non-intrusive way. In addition, these systems and methods may avoid the installation of DLP endpoint agents that may create large storage and memory footprints, may run as a system service, may install multiple drivers and plugins on an endpoint device, and/or may create API hooks into applications.

Accordingly, the systems and methods described herein may use DLL redirection to redirect any API calls that are made by applications, including API calls for performing file system activities (e.g., reading and writing sensitive information), data transfer over a network (email, HTTP, or other protocols), using a clipboard service to transfer data to another application, and/or printing sensitive information. When a wrapped application initiates, the wrapper may force the application to load the wrapper's own versions of DLLs instead of default system DLLs. The new DLLs may include code to control behavior of the application by redirecting API calls to alternate implementations of the API. In some examples, the wrapper may use an executable manifest file to specify which DLLs should be loaded by the applications. Thus, the wrapper may intercept API calls that wrapped applications make.

Figure 8:
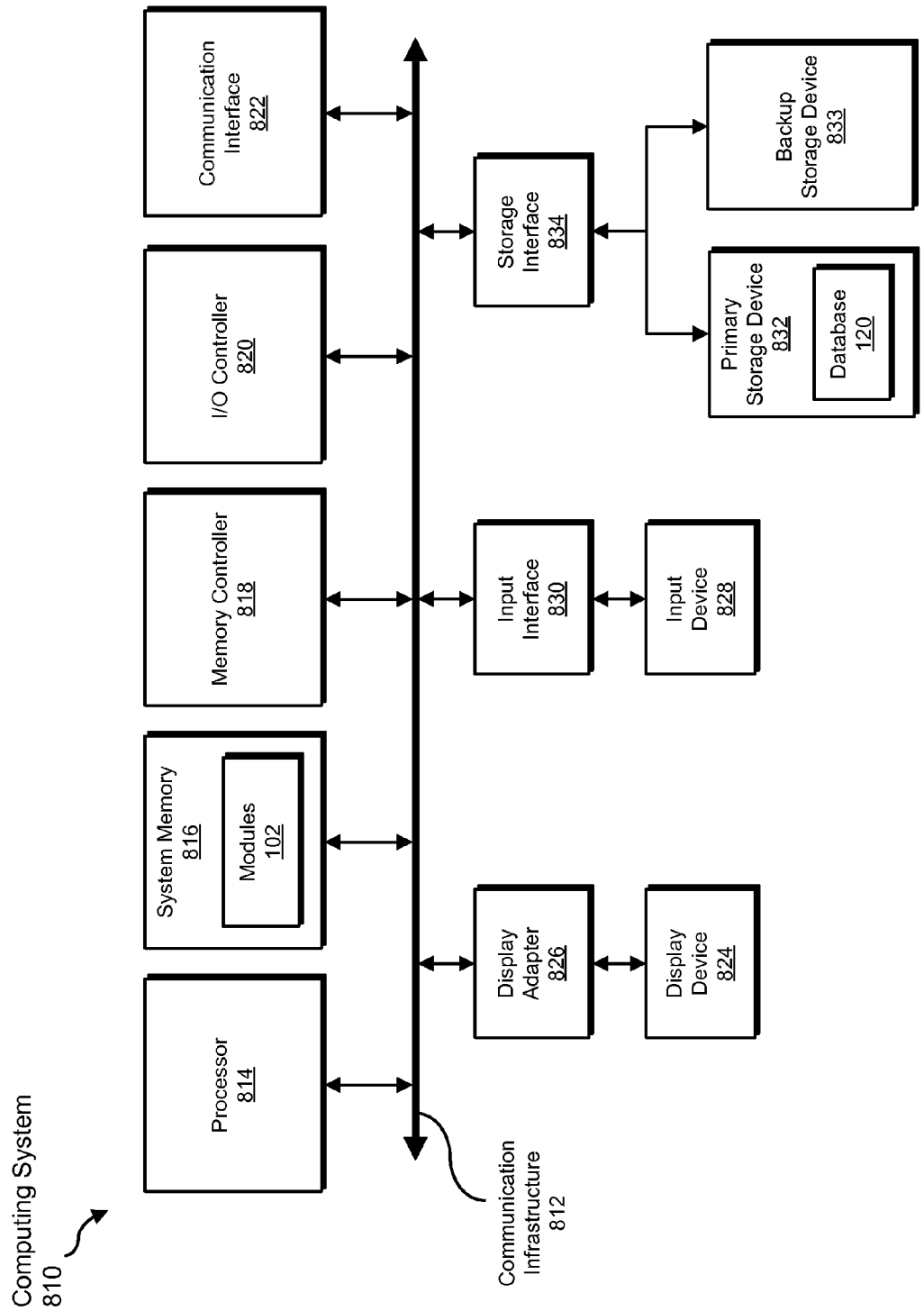
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
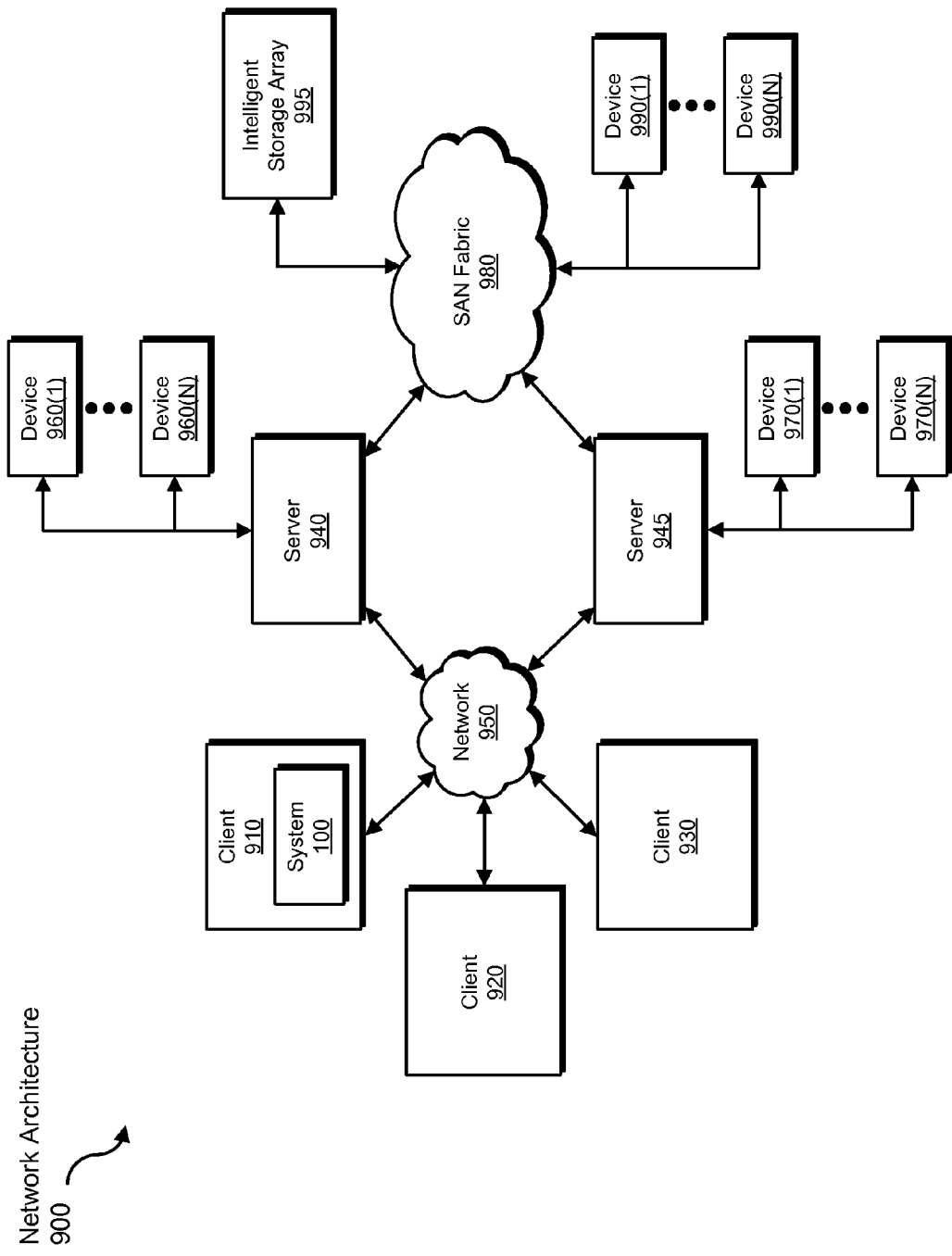
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for providing targeted data loss prevention on unmanaged computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application to be transformed, transform the application by wrapping the application in an application wrapper, output a result of the transformation to an unmanaged endpoint device, use the result of the transformation to provide targeted DLP protection for data handled by the wrapped application on the unmanaged endpoint device, and store the result of the transformation on the unmanaged endpoint device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing targeted data loss prevention on unmanaged computing devices, at least a portion of the method being performed by a computing device comprising at least one processor, the method comprising:

identifying a data loss prevention policy that defines permissible data handling within set bounds to prevent unauthorized data exfiltration from the set bounds;
identifying an application to install on at least one unmanaged endpoint device, where:
the unmanaged endpoint device lacks a data loss prevention agent configured to apply the data loss prevention policy to the entire unmanaged endpoint device;
the application is to be provided to the unmanaged endpoint device to operate on sensitive data from within the set bounds;
wrapping the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device.

2. The computer-implemented method of claim 1, wherein the application wrapper intercepts system calls from the application by redirecting the application from at least one default dynamic linked library that implements the system calls with at least one alternative dynamic linked library that applies the data loss prevention policy to the system calls.

3. The computer-implemented method of claim 1, wherein the application wrapper intercepts system calls from the application by injecting a dynamic linked library into a process of the application that hooks at least one application programming interface function within the process.

4. The computer-implemented method of claim 1, wherein the data loss prevention policy protects data that is owned by a first entity and the unmanaged endpoint device is owned by a separate entity.

5. The computer-implemented method of claim 1, further comprising installing the wrapped application on the unmanaged endpoint device.

6. The computer-implemented method of claim 5, wherein installing the wrapped application on the unmanaged endpoint device comprises installing the wrapped application on the unmanaged endpoint device in response to detecting that the unmanaged endpoint device has connected to a network that falls within the set bounds.

7. The computer-implemented method of claim 5, wherein:
the unmanaged endpoint device comprises an unwrapped instance of the application;
the unwrapped instance of the application is for personal use by an owner of the unmanaged endpoint device and is not subject to the data loss prevention policy;
an organization designates the wrapped instance of the application as for use by the owner of the unmanaged endpoint device to handle data that is owned by the organization and that is subject to the data loss prevention policy.

8. The computer-implemented method of claim 1, wherein the set bounds includes data handled by the wrapped application on the unmanaged endpoint device and excludes data handled by at least one unwrapped application on the unmanaged endpoint device.

9. The computer-implemented method of claim 1, further comprising streaming the wrapped application to the unmanaged endpoint device.

10. The computer-implemented method of claim 1, wherein applying the data loss prevention policy to the sensitive data implicated in the system calls comprises:
encrypting the sensitive data before writing the sensitive data to a storage device accessible by the unmanaged endpoint device to prevent access to the sensitive data outside the unwrapped application;
decrypting the sensitive data before reading the sensitive data from the storage device.

11. The computer-implemented method of claim 1, wherein applying the data loss prevention policy to the sensitive data implicated in the system calls comprises at least one of:
applying the data loss prevention policy to determine whether to transmit the sensitive data from the unmanaged computing device across a network;
applying the data loss prevention policy to determine whether to copy the sensitive data to a clipboard service on the unmanaged computing device;
applying the data loss prevention policy to determine whether to print the sensitive data via a printer accessible to the unmanaged computing device.

12. The computer-implemented method of claim 1, wherein:
the data loss prevention policy allows a mode of handling the sensitive data when the unmanaged computing device is connected to a network that is controlled by an entity that controls the data loss prevention policy;
the data loss prevention policy does not allow the mode of handling the sensitive data when the unmanaged computing device is not connected to the network.

13. A system for providing targeted data loss prevention on unmanaged computing devices, the system comprising:
a policy identification module, stored in memory, that identifies a data loss prevention policy that defines permissible data handling within set bounds to prevent unauthorized data exfiltration from the set bounds;
an application identification module, stored in memory, that identifies an application to install on at least one unmanaged endpoint device, where:
the unmanaged endpoint device lacks a data loss prevention agent configured to apply the data loss prevention policy to the entire unmanaged endpoint device;
the application is to be provided to the unmanaged endpoint device to operate on sensitive data from within the set bounds;
a wrapping module, stored in memory, that wraps the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device;
at least one physical processor configured to execute the policy identification module, the application identification module, and the wrapping module.

14. The system of claim 13, wherein the application wrapper intercepts system calls from the application by redirecting the application from at least one default dynamic linked library that implements the system calls with at least one alternative dynamic linked library that applies the data loss prevention policy to the system calls.

15. The system of claim 13, wherein the application wrapper intercepts system calls from the application by injecting a dynamic linked library into a process of the application that hooks at least one application programming interface function within the process.

16. The system of claim 13, wherein the data loss prevention policy protects data that is owned by a first entity and the unmanaged endpoint device is owned by a separate entity.

17. The system of claim 13, wherein the wrapping module further installs the wrapped application on the unmanaged endpoint device.

18. The system of claim 17, wherein the wrapping module further installs the wrapped application on the unmanaged endpoint device by installing the wrapped application on the unmanaged endpoint device in response to detecting that the unmanaged endpoint device has connected to a network that falls within the set bounds.

19. The system of claim 17, wherein:
the unmanaged endpoint device comprises an unwrapped instance of the application;
the unwrapped instance of the application is for personal use by an owner of the unmanaged endpoint device and is not subject to the data loss prevention policy;
an organization designates the wrapped instance of the application as for use by the owner of the unmanaged endpoint device to handle data that is owned by the organization and that is subject to the data loss prevention policy.

20. A non-transitory computer-readable medium comprising one or more computer-readable instructions that, when executed by at least one processor of a computing device, cause the computing device to:
identify a data loss prevention policy that defines permissible data handling within set bounds to prevent unauthorized data exfiltration from the set bounds;
identify an application to install on at least one unmanaged endpoint device, where:
the unmanaged endpoint device lacks a data loss prevention agent configured to apply the data loss prevention policy to the entire unmanaged endpoint device;
the application is to be provided to the unmanaged endpoint device to operate on sensitive data from within the set bounds;
wrap the application in an application wrapper that intercepts system calls from the application and applies the data loss prevention policy to sensitive data implicated in the system calls, where the application wrapper thereby applies the data loss prevention policy to data handled by the application instead of applying the data loss prevention policy to the entire unmanaged endpoint device.

* * * * *